L. D. Cogswell,
Fruit Picker.
No. 97,275.
Patented Nov. 30, 1869.
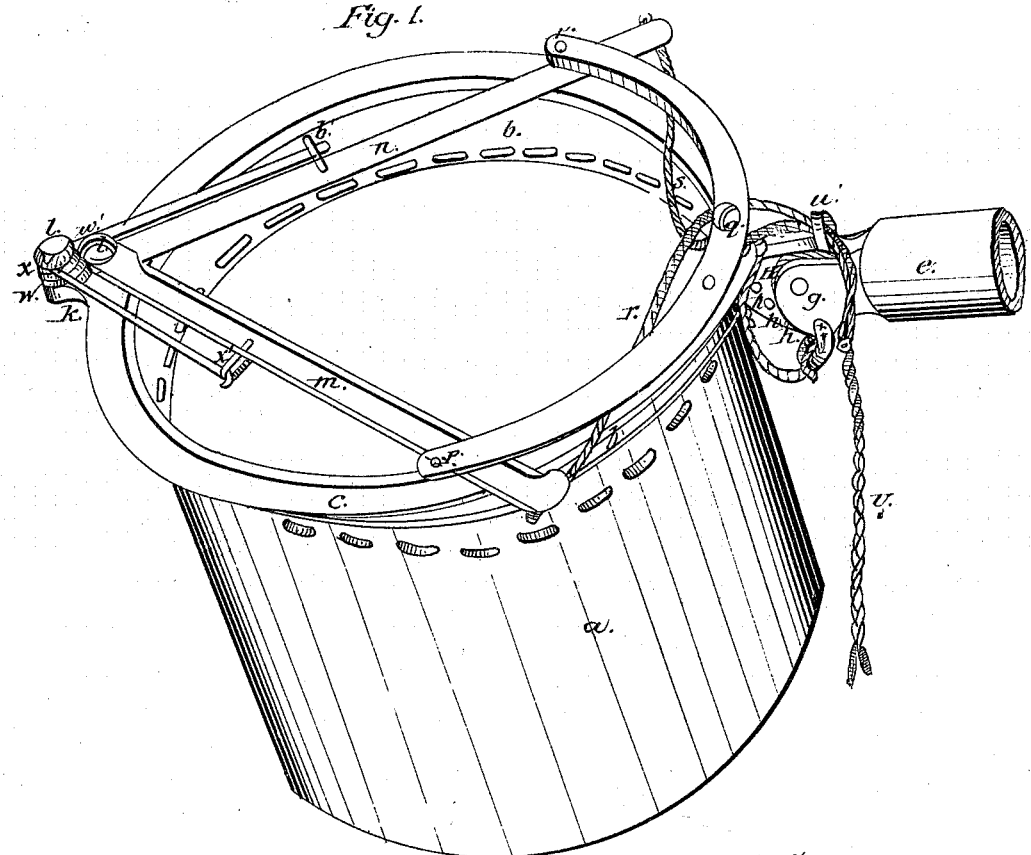
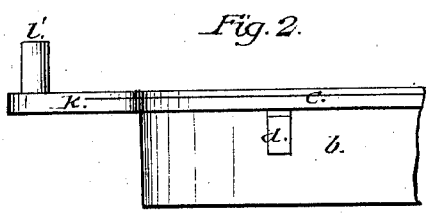
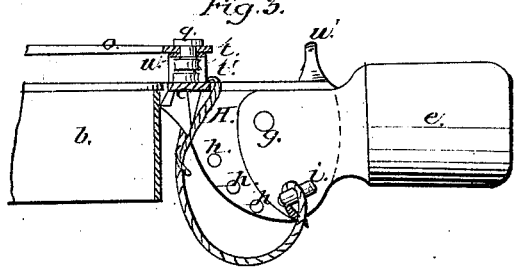
Witnesses:
R. P. Rawson
Geo. E. Percy
Inventor:
Lorenzo D. Cogswell

United States Patent Office.

LORENZO D. COGSWELL, OF LOWELL, MASSACHUSETTS.

Letters Patent No. 97,275, dated November 30, 1869.

IMPROVEMENT IN FRUIT-PICKERS.

The Schedule referred to in these Letters Patent and making part of the same.

To all whom it may concern:

Be it known that I, LORENZO D. COGSWELL, of Lowell, in the county of Middlesex, and State of Massachusetts, have invented new and useful Improvements in Fruit-Pickers; and I do hereby declare that the following is a full and exact description thereof, reference being had to the accompanying drawings, and to the letters of reference marked thereon.

The nature of my invention consists in providing a fruit-picker, that may be universally used, with but little inconvenience to the operator, in picking fruit of different kinds, either large or small, its several parts consisting of a receiver or bag, rims, two movable cutters, continuous spring, guide or guard, and an adjustable hinged joint, they being so constructed, arranged, and combined, as hereinafter described, as will render it effectual, desirable, simple, cheap, and useful.

To enable others skilled in the art to make and use my invention, I will proceed to describe its construction and operation.

Figure 1 represents a perspective view of my improved fruit-picker.

Figure 2 represents a side elevation of a part of the rims, showing how fastened together.

Figure 3 represents a sectional view, with parts removed, showing the construction and operation of the same more clearly.

Similar letters in the different figures indicate corresponding parts.

In the construction of my improved fruit-picker, $a$ represents the fruit-bag or receiver, formed of any given capacity, which is secured to the circular rim $b$.

On the top part of this rim $b$, a flange is formed, which, when placed within the top rim $c$, it rests on a corresponding seat, formed on the same, as shown in fig. 3 of the drawings.

This rim $b$ is secured to the rim $c$ by means of the brackets $d\ d$, as shown in fig. 2 of the drawings, these brackets $d\ d$ being placed at suitable distances apart from each other, as desired.

$e$ is a socket, into which is inserted the end of the pole or handle, this socket $e$ being provided with a screw-thread, formed in the same, and is pivoted to the stem $f$, said stem being formed on and projecting from the rim $c$.

This stem $f$ is further provided with suitable holes, $h\ h\ h$, all of which being on a radius with the pivot $g$, which holes $h\ h\ h$ correspond with the hole formed in the socket $e$, which receives the pin $j$, this stem $f$, and socket $e$, with holes $h\ h\ h$, and pin $j$, forming an adjustable hinged joint, the object of which being to set the fruit-bag or receiver $a$ in different angles, as may be required by the operator.

Located and formed on the rim $c$, directly opposite the stem $f$, is the ear $k$, from which projects the stud $l$, on which is pivoted and operates the movable cutters or shears $m$ and $n$, the other end of said cutters $m$ and $n$ operating between the guide or guard $o$, which is secured to the rim $c$ by means of the studs $p\ p$ and $q$.

Attached to the end of these movable cutters or shears $m$ and $n$, are the cords $r$ and $s$, which from thence they pass around the sheave-pulleys $t$ and $t'$, in opposite directions, said stud $q$ forming bearings for the same, and on which is placed the cord-guide $u$, which keeps the cords $r$ and $s$ on their respective pulleys.

These cords $r$ and $s$ then pass through the eye $u'$, formed on the stem $f$; the cords $r$ and $s$ then unite and form one cord, which then passes through eyes, they being secured to the handle or pole at the required distances apart, the length of the cord $v$ corresponding with the length of the handle or pole.

Located directly behind the stud $e$, and formed on the ear $k$, is the stud $v'$, around which is coiled the continuous spring $w$, said spring $w$ being kept in position by means of the collar $w'$ and pin $x$.

The ends of this spring $w$, projecting from the stud $v'$, they being nearly one-half the length of the cutters $m$ and $n$, and connect on the back part of the same by means of the links $x'\ x'$.

My improved device being thus constructed, of any given size, and its several parts adjusted in position, and secured to the pole or handle by means of the socket $e$, is then ready for use.

The operator selects the favorite ripe fruit to be picked. By aid of the pole or handle he elevates the fruit-picker, until the desired fruit enters the top part of the receiver or bag $a$, which brings the stem of the same always between the cutters or shears $m$ and $n$. The cord $v$ is then operated upon, which operation contracts the cutters $m$ and $n$, which brings them in contact with the same, cutting it off smoothly, the fruit dropping into the receiver $a$. The operator then relieves the cord $v$ from all strain, which, by aid of the continuous spring $w$, the cutters $m$ and $n$ resume their former positions, they then being in condition for another similar operation.

Thus it will be seen, by the arrangement and operation of the cutters $m$ and $n$, that however small the fruit to be picked is, or kind, if it enters the receiver $a$, the cutters $m$ and $n$ are always sure to operate upon it.

And also, by aid of the adjustable hinged joint, the operator is enabled to adjust the fruit-picker to the desired angle that will best suit his convenience in the operation of the same.

Besides, with the use of my improvement, the operator is enabled to pick his fruit at the proper time, easily and effectually, without the use of a ladder, or climbing into the tree, and at the same time entirely preventing bruising or damaging the fruit in the least, they being as free from all defects after being removed from the tree as before, thus furnishing a device that is simple, cheap, durable, and useful.

What I claim as my invention, and desire to secure by Letters Patent, is—

1. The movable cutters $m$ and $n$, and continuous spring $w$, in combination with the receiver $a$, when operating as described and specified.

2. The arrangement and construction of the cutters $m$ and $n$, continuous spring $w$, rims $b$ and $c$, receiver $a$, guide $o$, and adjustable hinged joint, all when combined and operating as described and specified.

LORENZO D. COGSWELL.

Witnesses:
R. T. RAWSON,
GEO. E. PEVEY.